(12) United States Patent
Ramos et al.

(10) Patent No.: US 7,967,975 B2
(45) Date of Patent: Jun. 28, 2011

(54) SEALING SYSTEM FOR CYCLONE LEG

(75) Inventors: José Geraldo Furtado Ramos, Rio de Janeiro (BR); Eduardo Cardoso de Melo Guerra, Petrópolis (BR); José Mozart Fusco, Niterói (BR); Aurélio Medina Dubois, Rio de Janeiro (BR); Wilson Kenzo Huziwara, Rio de Janeiro (BR); Waldir Pedro Martignoni, São Mateus do Sul (BR)

(73) Assignee: Petróleo Brasileiro S.A. - Petrobras, Rio de Janeiro (BR)

( * ) Notice: Subject to any disclaimer, the term of this patent is extended or adjusted under 35 U.S.C. 154(b) by 0 days.

(21) Appl. No.: 12/588,787

(22) Filed: Oct. 28, 2009

(65) Prior Publication Data

US 2010/0071553 A1  Mar. 25, 2010

Related U.S. Application Data

(62) Division of application No. 09/725,165, filed on Nov. 29, 2000, now abandoned.

(30) Foreign Application Priority Data

Dec. 14, 1999 (BR) ..................................... 9905842

(51) Int. Cl.
*B01D 45/12* (2006.01)
*B01J 8/24* (2006.01)
(52) U.S. Cl. ............. 208/161; 422/147; 55/345; 95/271
(58) Field of Classification Search .................. 208/161; 422/147; 55/345; 95/271
See application file for complete search history.

(56) References Cited

U.S. PATENT DOCUMENTS

| 2,341,671 | A | 2/1944 | Ter Linden |
| 2,634,191 | A | 4/1953 | Jones |
| 2,815,268 | A | 12/1957 | Kaulakis |
| 2,895,907 | A | 7/1959 | Crosby |
| 2,901,331 | A | 8/1959 | Held et al. |
| 3,231,326 | A | 1/1966 | Stine et al. |
| 3,353,925 | A | 11/1967 | Baumann et at |
| 3,821,103 | A | 6/1974 | Owen et al. |
| 4,074,691 | A | 2/1978 | Luckenbach |

(Continued)

FOREIGN PATENT DOCUMENTS

BR   PI 9603898-5   9/1996

(Continued)

OTHER PUBLICATIONS

Perry's Chemical Engineering Handbook, 7$^{th}$ Edition, 1997, pp. 17-1 to 17-4.

(Continued)

*Primary Examiner* — Jennifer A Leung
(74) *Attorney, Agent, or Firm* — Nixon & Vanderhye PC

(57) ABSTRACT

A system for sealing the legs of two stages of cyclones in series used in fluid catalytic cracking (FCC) processes, comprising a terminal leg configuration, which is devoid of moving parts and makes use of a long-radius curve, and which changes the flow direction of the descending mass flow of catalyst in dense phase into a plane orthogonal to the ascending gaseous flow. This prevents the entry of gaseous phase inside the leg, and promotes efficient sealing and preventing the "packing-down" of the dense bed of particulates.

7 Claims, 3 Drawing Sheets

U.S. PATENT DOCUMENTS

| | | |
|---|---|---|
| 4,220,623 A | 9/1980 | Jahnke et al. |
| 4,246,231 A | 1/1981 | Figler et al. |
| 4,324,563 A | 4/1982 | Jones |
| 4,362,442 A | 12/1982 | Bentzen-Bilkvist et al. |
| 4,422,925 A | 12/1983 | Williams et al. |
| 4,871,514 A | 10/1989 | Ross |
| 4,996,028 A | 2/1991 | Danielsen et al. |
| 5,079,379 A | 1/1992 | Braun et al. |
| 5,248,411 A * | 9/1993 | Chan .............................. 208/161 |
| 6,197,266 B1 | 3/2001 | Mozart Fusco et al. |
| 2001/0003575 A1 | 6/2001 | Ramos et al. |

FOREIGN PATENT DOCUMENTS

| | | |
|---|---|---|
| GB | 2 212 248 | 7/1989 |
| WO | WO 89/02785 | 4/1989 |

OTHER PUBLICATIONS

Perry's Chemical Engineering Handbook, $7^{th}$ Edition, 1997, pp. 17-12 to 17-13.

Zenz, Frederick A., Chapter 12: Cyclone Design, Fluidization, Solids Handling, and Processing, 1998, pp. 812-815.

* cited by examiner

SEALING SYSTEM FOR CYCLONE LEG

This application is a Division of application Ser. No. 09/725,165, filed Nov. 29, 2000, now abandoned, the entire contents of which are hereby incorporated by reference into this application. This application is also based on and claims priority from Brazilian Patent Application No. PI 9905842-1, filed on Dec. 14, 1999, the contents of which are hereby incorporated by reference into this application.

FIELD OF THE INVENTION

The present invention relates to a sealing system for the leg of a cyclone for separating out solids in gas/solid suspension. More specifically, the present invention relates to a sealing system for two-stage legs of in-series cyclones used in fluid catalytic cracking (FCC) processes.

STATE OF THE ART

The purpose of the fluid catalytic cracking (FCC) process is to convert hydrocarbons with a high boiling point into light hydrocarbon fractions, such as gasoline and liquefied petroleum gas (LPG). The catalyst used in fluid catalytic cracking units consists of a powder of controlled particle size, which is intimately mixed with the feed to the FCC unit and subsequently with the cracking products which are also gaseous, forming a gas/solid suspension which has to be separated efficiently in order to minimize catalyst losses from the FCC unit, providing obvious advantages for the refiner and for the environment.

In the field of separation of solid particles in gaseous suspension, it is customary to use cyclones as the mechanism for separating out the solids in gas/solid suspension. Cyclones of this type normally have a device at their solid-material discharge ends or, as is more well-known, at the ends of the legs of the cyclones. This device acts as a sealing element, preventing the contraflow of the gaseous stream to the inside of the cyclone, which would considerably reduce its separation efficiency.

Typically, in the specific case of fluid catalytic cracking (FCC) processes use is made of a pair of cyclone separators in series in order to maximize the separation of the particles—the process catalyst—from the gas/solid suspension. The use of more than one set of cyclone separators is also a fairly common arrangement, depending on the size and model of the FCC unit's separator vessel. Separation of the greater part of the particles takes place in the first separation stage (primary cyclone), after which a much lower concentration is left behind in which the catalyst particles for the second separation stage (secondary cyclone) are of smaller average size. In this known method of operation, the internal pressure in the cyclones is always below the pressure of the separator vessel, hence there is a need to seal the lower end of the legs of the cyclones by means of the use of sealing devices.

The catalyst collected in the cyclones flows in free fall to the legs of the cyclones, forming a dense column of solids which after reaching a specific level establishes a pressure equilibrium between the base of the cyclone leg and the inside of the separator vessel. Pressure equilibrium having been achieved, the cyclone-discharge process begins with the opening of the sealing devices. It is precisely during the process of discharging the solids collected in the cyclone legs that significant loss of solids from this system occurs. Initially, the downward flow of solids maintains the seal in the system owing to the existence of the column of solids. When discharging is almost complete, the column of solids is already significantly smaller and the pressure differential breaks the seal of the dense phase, and an ascending gaseous flow originating from the base of the leg is then formed, returning some particulate material already collected and prejudicing cyclone operation. When the effect of the catalyst-discharge movement on the sealing device ceases, the sealing device returns to its normal position of equilibrium and another cycle of collection and accumulation of particulates commences. In practice it has been observed that the return of particulate material is more intense in the second separation stage, owing to the greater pressure differential to which this equipment is subjected and to the smaller average size of the particles making up the particulate material in this second separation stage.

In the light of the above, it has been concluded that a critical point in the process of separation using cyclone separators, with direct influence on the efficiency of the FCC process, is the seal provided by the sealing devices of the cyclone legs. Sealing devices take various forms, such as valves with a counterweight (flapper valve), valves involving dripping (trickle valve) and others in the form of planar or conical plates (splash plates) and, also, combinations of these.

These devices, working in fairly severe conditions such as temperatures in excess of 500° C. and a high solids charge, do not normally provide efficient sealing so they can allow the passage of an ascending flow of gas from the separator vessel to the inside of the cyclone leg. For example, a flow greater than 0.10% of the total volume fed into the input opening of the cyclone gives rise to the return of finer particles of solid, disrupting cyclone operation and reducing the cyclone's separation efficiency.

With a view to solving the problem of the sealing device, GB-A-2,212,248 teaches a method for constructing a flapper valve which allows practically total sealing through the application of a conical section installed between the base of the valve and the seat of the cyclone leg. However, it is important to remember that a small passage of gas fed into the cyclone opening is beneficial, since it fluidizes the solid which has accumulated in the cyclone leg, facilitating its discharge. Therefore, the attempt to minimize the passage of the flow of gas through the valve, as proposed by GB-A-2,212,248, may give rise to the loss of fluidization of the solid which has accumulated in the cyclone leg, especially in the second separation stage in which the solids charge is fairly dilute and may be of the order of 0.2 to 1.5 grammes of particulate per cubic meter of gas. With this operating condition, the period for accumulation of solids for achieving pressure equilibrium, and therefore the frequency of discharge of the solids from the dip leg, may be greater than eight hours, and if there is not a minimum flow of gas through the valve the dense bed of particulates may become "packed down", with a possible risk of complete obstruction of the cyclone leg and loss of efficiency thereof.

As an alternative to the modification of sealing devices, Brazilian Patent Application PI 9603898 of the applicant (fully incorporated as reference) teaches that it is possible to prevent the return of the particulate material to the inside of cyclones for separating gas/solid suspensions in fluid catalytic cracking units through the formation of a leg complex composed of the joining of the primary-cyclone leg and the secondary-cyclone leg, eliminating one of the two sealing devices, which are the principal source of problems and leaks in cyclone separation systems. However this arrangement, although very satisfactory in a variety of instances, may not afford the desired benefits for certain fluid catalytic cracking units, principally those in which the physical arrangement of the primary and secondary cyclones does not allow the joining of the cyclone legs as taught in Brazilian Patent Application PI 9603898.

Despite the attempts described in the literature to solve the problems of loss of efficiency of cyclones in connection with the return of particulates during the cycle of opening the sealing device of the legs of cyclones used as gas/solid-suspension separators in catalytic cracking (FCC) processes, a definitive solution capable of maintaining a high cyclone operating efficiency in a simple, economical and safe manner has not yet been achieved. However such a solution is presented by the system described herein.

SUMMARY OF THE INVENTION

The present invention provides a sealing system for the leg of a cyclone for separating out solids from a particulate suspension which joins the lower end of the leg of the secondary cyclone and the leg of the primary cyclone, forming a single primary and secondary cyclone leg complex where the solids collected by both cyclones are combined, characterized by the said combined solids being simultaneously discharged by means of a single leg termination of the long-radius-curve type.

Such a system can be used as a termination system for two series stages of cyclones used in fluid catalytic cracking (FCC) processes for separating out solids in gas/solid suspension. The terminal configuration allows improved, efficient sealing in such a manner as to prevent the re-entrainment of particulates, and to reduce or eliminate the risk of the "packing-down" of the dense bed of particulates collected in the cyclones. It avoids the mechanical failures which may arise in movable sealing systems, since flapper or trickle valves are dispensed with. The result of its use is a substantial increase in efficiency and a consequent reduction of particulate emission.

BRIEF DESCRIPTION OF THE DRAWINGS

The characteristics of the cyclone-leg sealing system which is the subject of the present invention will be better understood from the following detailed description, which is given purely by way of example, in association with the drawings, to which reference is made below and which are an integral part hereof.

DETAILED DESCRIPTION OF THE INVENTION

The detailed description of the cyclone-leg sealing system will be given in accordance with the identification of its component parts, based on the above-described Figures.

Figure 1:
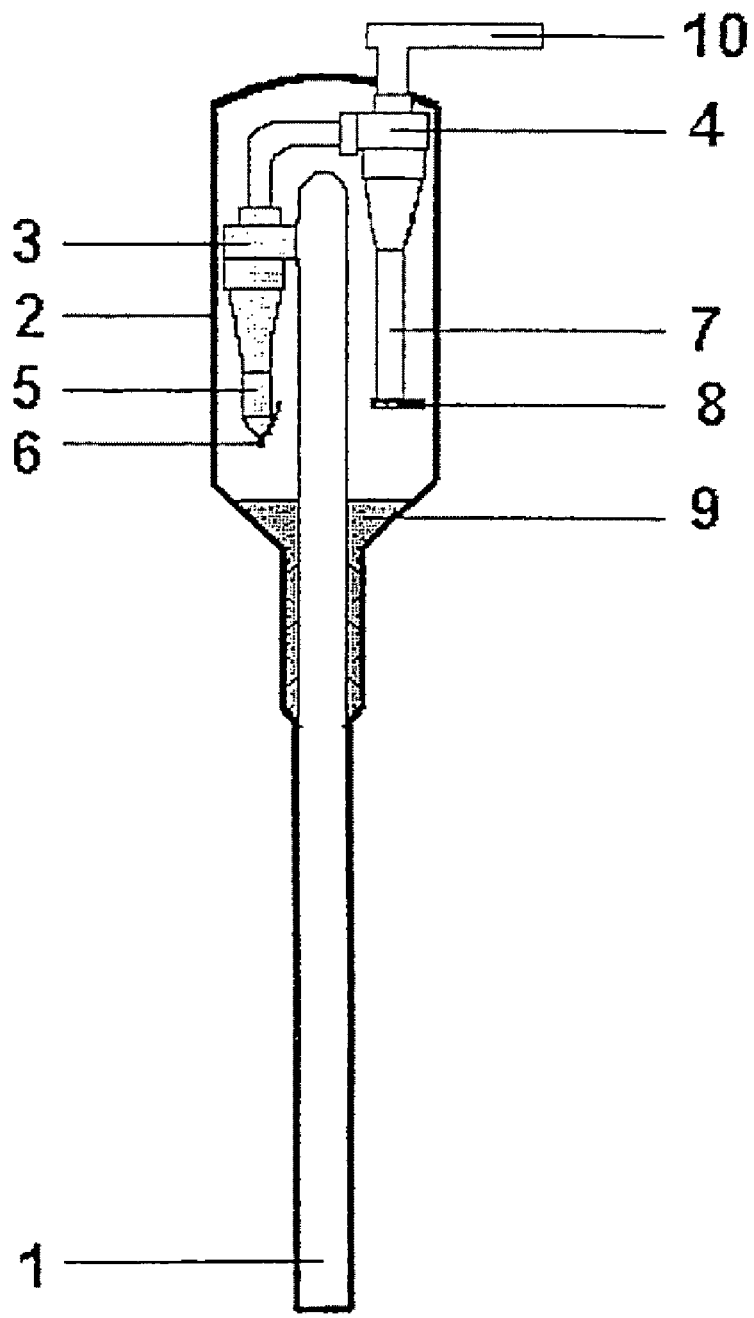
FIG. 1 shows a representation of the reaction/separation assembly of a typical FCC unit of the prior art.

FIG. 1 shows a standard reaction/separation unit for a fluid catalytic cracking process. The process comprises promoting cracking reactions in a charge of hydrocarbons in gaseous phase in suspension with particles of catalyst over the full length of an ascending-flow tube reactor which will hereinafter be called "riser" (1). As a result of the reactions, a carbonaceous deposit is formed on the surface of the catalyst.

Rapid separation of the particles of coked catalyst in suspension in the cracked hydrocarbons is promoted at the top end of the riser (1). In this manner, the reaction's effluent stream enters a first cyclone separator (3) where separation of the greater part of the catalyst in suspension takes place. Through the action of gravity, the catalyst flows in free fall to the leg (5) of the cyclone (3) and is retained by the sealing valve (6) which is shown, by way of example, as a trickle valve.

The cracked hydrocarbons separated out in the first cyclone (3), still entraining particles of catalyst, then enter the second cyclone (4) where they are completely separated out, the gaseous phase moving on to external systems (10) for fractionation of the cracked products and the particles of the catalyst descending, as occurred previously in the cyclone (3), to the leg (7) of the cyclone (4) where they are retained in the sealing valve (8), which is shown by way of example as a flapper valve.

Thanks to the column of particles of catalysts which accumulate on the caps of the sealing valves (6, 8), at a specific instant in the process a pressure equilibrium is obtained between the inner lower part of the legs (5, 7) of the cyclones (3, 4) and the inside of the separator vessel (2), where the pressure is normally in excess of those encountered inside the cyclones. As soon as the valve cap is opened, through the force of the equalization of pressures the column of solids which has accumulated in the legs of the cyclones flows to the fluidized bed (9) which is accumulating in the lower part of the separator vessel (2). At this time, the conditions under which there is equilibrium of the pressures cease, causing the valve cap to return to the closed position.

This is the most critical moment in the separation stage since, owing to the period of time required for complete closure of the sealing valve, it is practically impossible to prevent some re-entrainment of catalyst particles back inside the cyclone through the force of an almost inevitable contra-flow of gaseous stream through the inside of the cyclone leg. Therefore, conventional cyclone separation systems nearly always operate outside ideal conditions of efficiency and profitability.

The joining of the legs of a primary cyclone and a secondary cyclone, such that the solid material is collected by both cyclones and discharged by means of a single valve at the end of the combined leg section of the cyclones, is also a known technique. In this technique, the reduction of catalyst losses grew more efficient.

Figure 2:
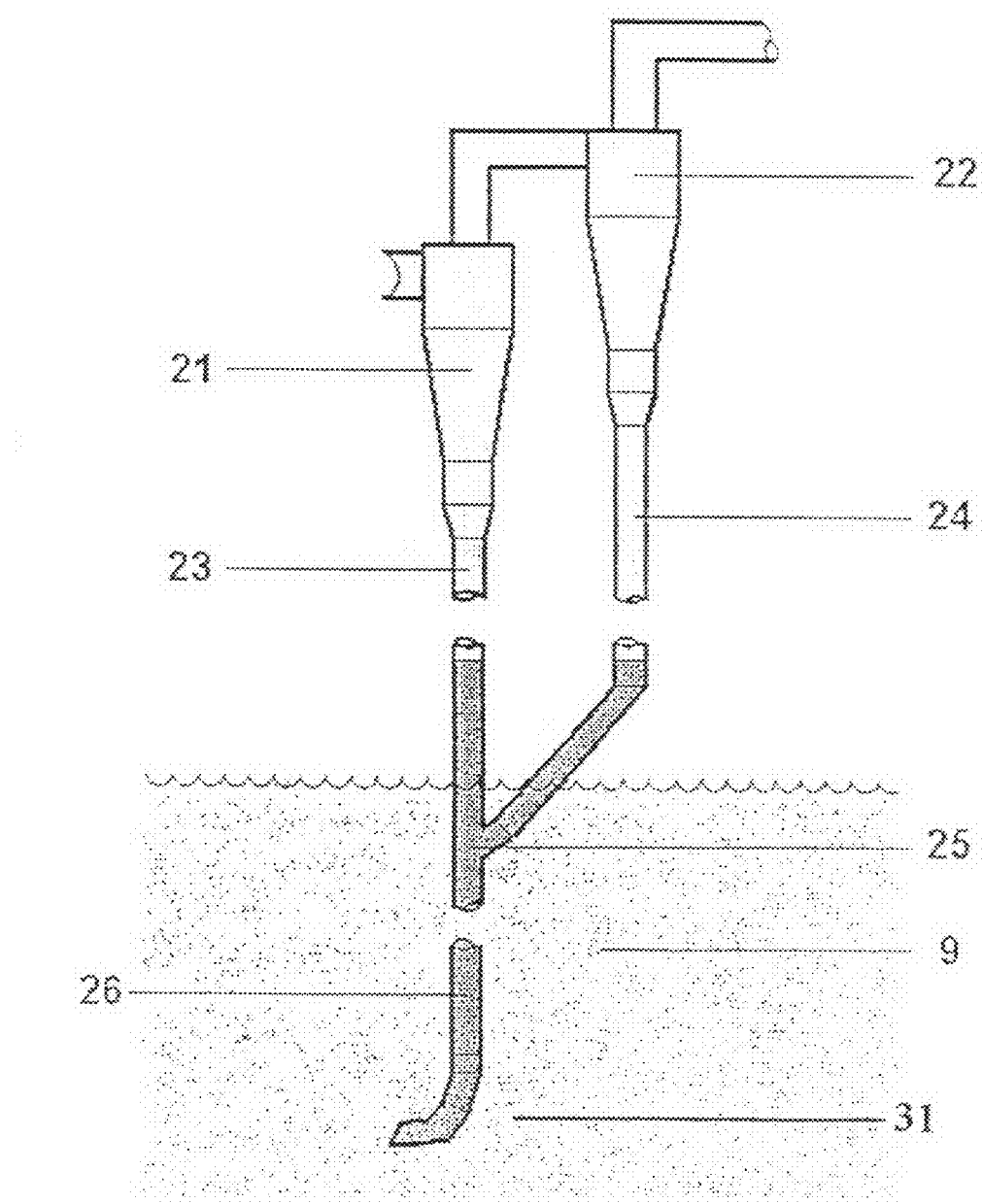
FIG. 2 shows a representation of the separation assembly of an FCC unit according to the present embodiment.

FIG. 2 shows an embodiment of the present invention consisting of a cyclone-type separation system which comprises a primary cyclone (21) and a secondary cyclone (22). The legs (23, 24) of the two cyclones are interlinked to form a junction (25) where the solids, which have been collected, are combined. The single leg (26) is immersed in the fluidized bed (9) and ends in a sealing system of the said leg (26).

Figure 3:
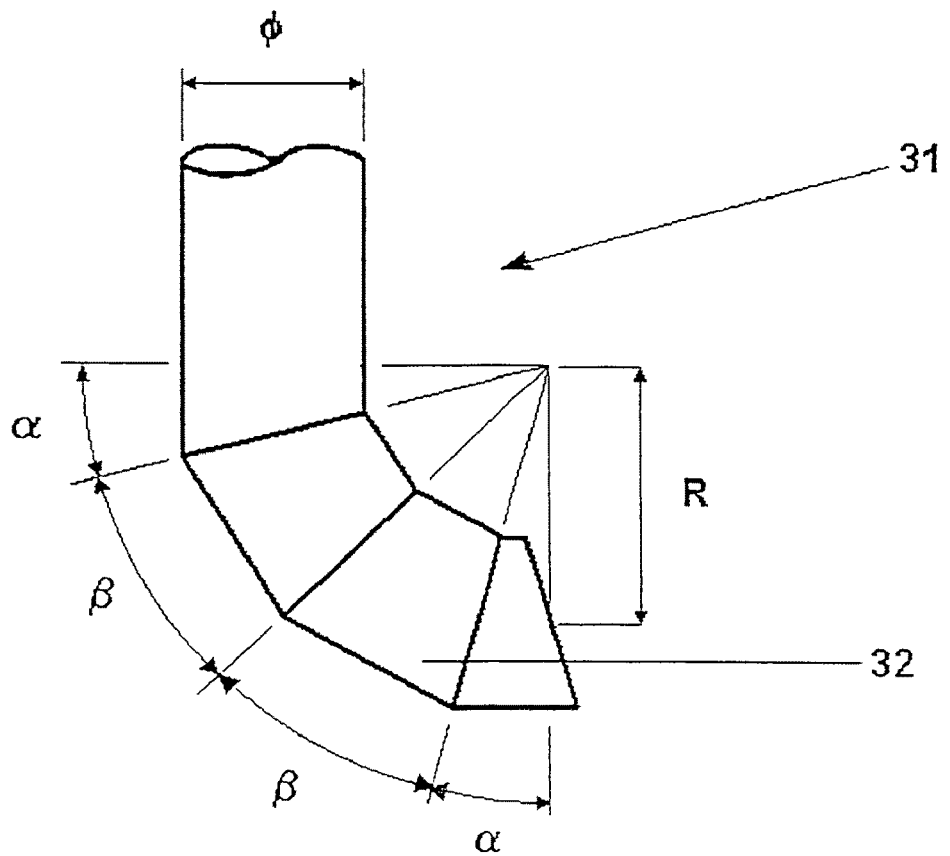
FIG. 3 shows a representation of a terminal section of a cyclone leg according to the present embodiment.

FIG. 3 shows, in greater detail, the proposed sealing system which comprises the use, at the bottom of the single leg 26, of a long-radius curve termination (31) which is devoid of moving parts. The said curve (31) has a ratio of "radius"(R)/diameter($\phi$) of the single leg (26) which varies in the region from 1.0 to 3.0 and is constructed from a plurality of straight tube sections offset by specific angles of inclination ($\alpha$, $\beta$), these sections hereinafter being called "buds" (32).

As shown in FIG. 3, the inlet to the long radius curve termination 31 is vertical at the foot of the single leg 26 after the junction 25 between the two cyclone legs 23 and 24. It is preferable that the direction of discharge from the termination 31 be horizontal, i.e. orthogonal to the inlet direction represented by the centre line of the single leg 26, so whereas the angle $\beta$ represents the angle subtended by the first and subsequent (in this case second) straight sections 32 of the long radius curve termination 31, the angle $\alpha_1$, represents the angle between the horizontal line through the centre of curvature and the start of the first straight section 32 and the angle $\alpha_2$ represents the angle between the end of the last (in this case second) straight section 32 and a vertical line through the centre of curvature. Preferably $\alpha_1$ and $\alpha_2$ are equal. Equally it is desirable for the total value of $\alpha_1+\alpha_2+n\cdot\beta$ to be in the range 75° to 100°, more preferably 90°, where n is the number of straight sections 32.

The angular offset which exists between the buds (32) change the flow direction of the descending mass flow of catalyst in dense phase into a plane orthogonal to the ascending gaseous flow, which prevents the entry of gaseous phase inside the leg (24), promoting efficient sealing and, simultaneously, preventing the "packing-down" of the dense bed of particulates which have collected inside the said leg (24).

The greater sealing efficiency of the present embodiment is achieved when, with respect to the centre line of the inlet to the long radius curve (31), the junction (25) between the leg of the primary cyclone (21) and the leg of the secondary cyclone (22) lies on the opposite side vis-à-vis the discharge end of the curve termination (31), and at a higher elevation by a distance in the range of from 3.5 to 5.5 times the diameter of the leg (23) of the primary cyclone (21).

The above-described assembly applies to all internal cyclone systems of FCC units, i.e. reactor and regenerator, since it does not depend on the level of fluidization of the catalyst bed; its application includes not only a bubbling bed, which is characteristic of operation at a low gas-flow surface velocity (typical of a stripper bed), but also turbulent fluidized beds with a high fluidization velocity, as are found in FCC regenerators.

The above description of the cyclone leg sealing system of the present invention must be regarded only as one of a number of possible embodiments, and any particular characteristics introduced therein must be understood as being described only in order to facilitate understanding. Therefore, they may not be regarded in any way as restricting the invention which is limited only by the scope of the following claims.

What is claimed is:

1. A method for separating out solids from a particulate suspension, comprising:
   providing a cyclone separator system, including a primary cyclone and a secondary cyclone disposed in series in a separator vessel, and a single cyclone separator leg which joins a lower end of a leg of the secondary cyclone and a leg of the primary cyclone to form a single primary and secondary cyclone leg complex where solids collected by both cyclones are combined,
   wherein the leg of the primary cyclone extends substantially straight and vertically aligned with a center axis of the primary cyclone to a junction thereof with the leg of the secondary cyclone, the leg of said secondary cyclone is inclined with respect to a center axis of said secondary cyclone to extend from said secondary cyclone to said junction, and said single cyclone separator leg extends substantially straight and vertically aligned with the center axis of the primary cyclone, from the junction and along at least a portion of a length thereof,
   wherein said single cyclone separator leg is immersed into a fluidized bed of particles within said separator vessel and terminates distally in a single leg termination disposed in said fluidized bed,
   wherein a pressure in the separator vessel is in excess of those inside the primary and secondary cyclones, whereby said secondary and primary cyclones are negative pressure cyclones, each having an internal pressure always less than that of the gaseous phase or the fluid phase of the fluidized bed in the separator vessel,
   wherein said collected and combined solids are discharged from said single cyclone separator leg through said single leg termination, and
   wherein the level of dense phase solids within the secondary and primary cyclone legs is located above the junction of the lower ends of the secondary and primary cyclone legs.

2. A method according to claim 1, wherein said single cyclone separator leg terminates distally in an open, single leg termination devoid of movable sealing parts at all times.

3. A method according to claim 2, wherein the open, single leg termination is radius-curved.

4. A method according to claim 3, wherein the radius-curve of the single leg termination has a ratio of radius/diameter within the range from 1.0 to 3.0.

5. A method according to claim 3, wherein said radius-curved single leg termination is constructed from a succession of straight tube sections in an arcuate array.

6. A method according to claim 5, wherein the succession of straight tube sections of the radius-curve direct a descending mass flow of dense phase solids into a plane orthogonal to an ascending gaseous flow.

7. A method according to claim 3, wherein, with respect to the centre line of an inlet to the radius-curved single leg termination, a junction of the leg of the primary cyclone and the leg of the secondary cyclone lies on the side opposite a distal end of the radius-curved termination and higher than the distal end by a distance in the range from 3.5 to 5.5 times a diameter of the leg of the primary cyclone.

\* \* \* \* \*